United States Patent Office  3,326,781
Patented June 20, 1967

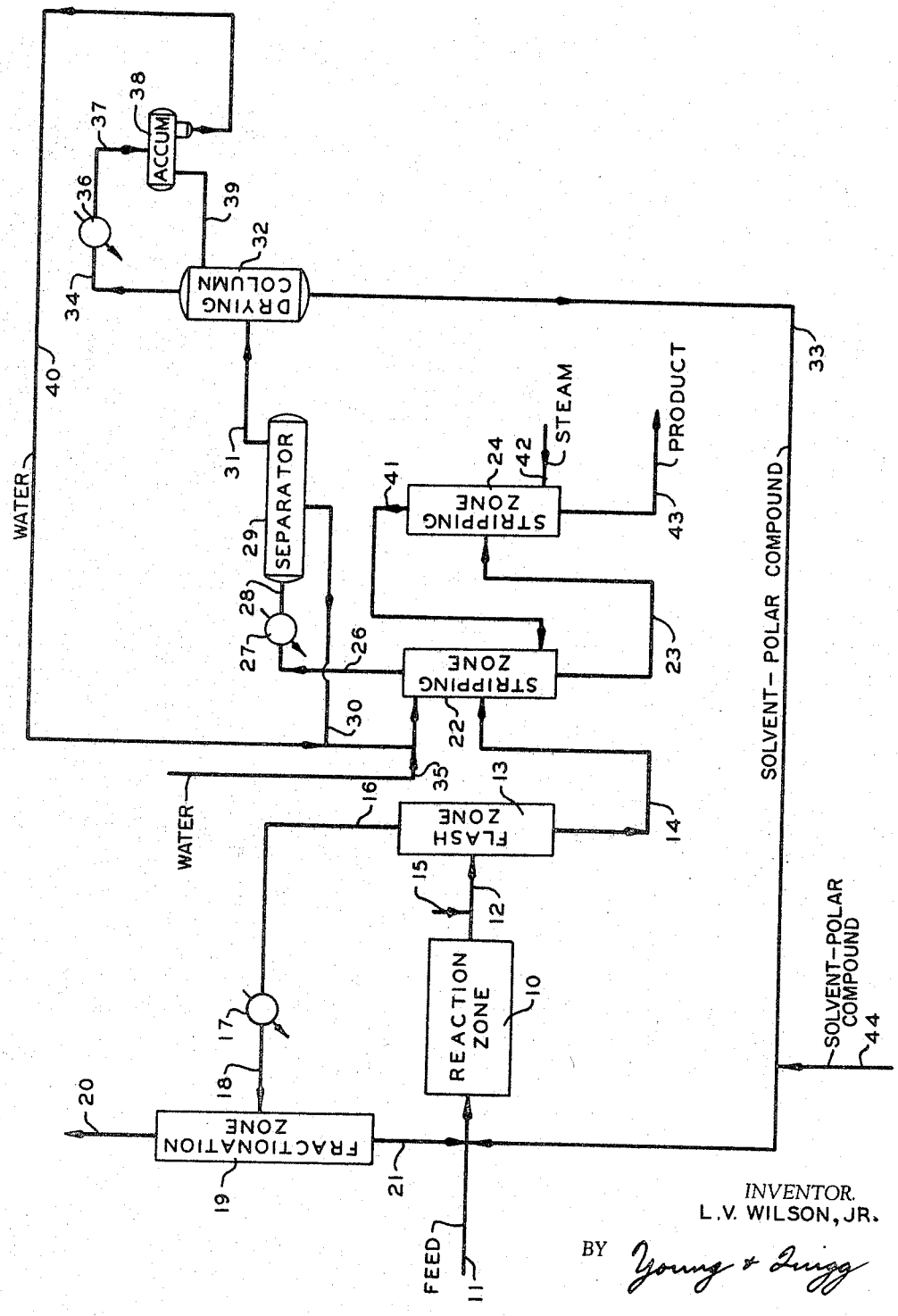

3,326,781
RECOVERY OF ORGANIC POLAR COMPOUNDS FROM POLYMERIZATION PROCESSES
Lawrence V. Wilson, Jr., Bartlesville, Okla., assignor to Phillips Petroleum Company, a corporation of Delaware
Filed July 15, 1963, Ser. No. 294,984
4 Claims. (Cl. 203—83)

This invention relates to the recovery of polar compounds from polymerization processes. In another aspect, this invention relates to a process for the recovery of organic polar compounds wherein the polymerization reaction is conducted in the presence of an organic solvent and an organic polar compound, and the solvent is recovered from the polymerization zone effluent by a steam stripping process step.

Random copolymers can be prepared by a polymerization process which employs organolithium compounds as a polymerization catalyst. The polymerization can be carried out in the presence of a solvent mixture comprising a hydrocarbon selected from the group consisting of aromatic hydrocarbons, paraffins and cycloparaffins, and an organic polar compound which does not inactivate the organolithium compound employed as the catalyst. The solvent is separated from the polymerization zone effluent by a flash vaporization step and by contacting the liquid mixture withdrawn from the flash vaporization step with steam in a stripping zone. The polar compound is withdrawn with the flashed solvent and from the stripping zone with the vaporous solvent and stripping steam. The solvent is separated from the steam in a subsequent separation step and recycled to the polymerization zone. At least a portion of the polar compound is conventionally lost to the polymerization process and withdrawn as a waste stream from the solvent-steam separation step.

Accordingly, an object of my invention is to provide a process for the recovery of organic polar compounds from polymerization zone effluent streams.

Another object of my invention is to provide a process for the recovery of organic polar compounds from polymerization zone effluent streams wherein steam is employed to separate the solvent from the product polymer.

Other objects, advantages and features of my invention will be readily apparent to those skilled in the art from the following description, drawing and appended claims.

Broadly, my invention comprises withdrawing a mixture of steam, solvent and polar compound from a polymerization zone solvent stripping zone, condensing said mixture and passing said mixture to a liquid phase separation zone, recycling a water phase from said liquid phase separation zone to said solvent stripping zone, passing a liquid hydrocarbon phase from said liquid phase separation zone to a solvent drying zone, withdrawing water from said drying zone and recycling said withdrawn water to said solvent stripping zone, and passing a liquid hydrocarbon phase from said drying zone to the polymerization reaction zone.

The invention is applicable to polymerization processes wherein the polymerization reaction is conducted in the presence of a solvent and an organic polar compound, and wherein the solvent and polar compound are separated from the product polymer by steam stripping the polymerization zone effluent.

The invention is particularly applicable in the production of polymeric materials, primarily rubbery materials, wherein the polymer is produced in the presence of organometal initiators. The invention will hereinafter be described as applied to a process for the preparation of copolymers of certain selected conjugated dienes and other unsaturated compounds, utilizing an organolithium compound as the catalyst, although it is not intended that the invention should be limited thereto.

In the preparation of copolymers of certain selected conjugated dienes and other unsaturated compounds, the process comprises contacting at least two members selected from the group consisting of 1,3-butadiene, 2-methyl-1,3-butadiene (isoprene), 1,3-pentadiene (piperylene), vinyl-substituted aromatic hydrocarbons, vinyl halides, vinylidine halides, esters of acrylic acids and esters of homologs of acrylic acids with an organolithium compound in the presence of a solvent mixture comprising (1) a hydrocarbon selected from the group consisting of aromatic hydrocarbons, paraffins and cycloparaffins, and (2) a polar organic compound. Generally, the polar compound used in the solvent mixture is one which does not inactivate the organolithium compound. It is preferred that one of the monomeric materials employed in the process be one of the conjugated dienes, i.e., 1,3-butadiene, 2-methyl-1,3-butadiene or 1,3-pentadiene. It is also preferred that two monomers in a weight ratio of 5:95 to 95:5 be utilized in a process to produce a binary copolymer.

Any suitable vinyl-substituted aromatic hydrocarbon can be employed in the polymerization process. Examples of suitable vinyl-substituted aromatic hydrocarbons include styrene, divinylbenzene, 3-vinyltoluene, 1-vinylnaphthalene, 2-vinylnaphthalene, 3-methylstyrene, and the like.

As heretofore indicated, vinyl halides and vinylidine halides can be employed in the polymerization process. Examples of suitable halides include vinyl chloride, vinyl bromide, vinylidine chloride, and the like. Esters of acrylic acid and esters of homologs of acrylic acid can also be employed in preparing the copolymers. Examples of such compounds include methyl methacrylate, ethyl acrylate, ethyl ethacrylate, methyl acrylate, ethyl methacrylate, methyl proacrylate, propyl acrylate, n-butyl acrylate, phenyl methacrylate, and the like.

The polymerization is carried out in the presence of a solvent mixture comprising a hydrocarbon selected from the group consisting of aromatic hydrocarbons, paraffins and cycloparaffins, and a polar compound which does not inactivate the organolithium compound employed as the catalyst. The solvent mixture is one which is liquid under the conditions of the process. Examples of suitable hydrocarbons which can be used as one of the components of the two-component solvent mixture include propane, isobutane, n-pentane, isooctane, n-dodecane, cyclopentane, cyclohexane, methylcyclopentane, ethylcyclopentane, dimethylcyclopentane, ethylcyclohexane, benzene, toluene, xylene, ethylbenzene, naphthalene, and the like. Mixtures of these various materials can also be employed.

Examples of polar compounds which do not inactivate the organolithium catalyst and which can, therefore, be employed as the second component of the solvent mixture are ethers, thioethers (sulfides) and tertiary amines. Specific examples of such polar materials include dimethyl ether, diethyl ether, ethyl-methyl ether, ethylpropyl ether, di-n-propyl ether, di-n-octyl ether, dibenzyl ether, diphenyl ether, pentacyl, tetramethylene oxide (tetrahydrofuran), 1,2-dimethoxyethane, dioxane, paraldehyde, methyl sulfide, diethyl sulfide, di-n-propyl sulfide, di-n- butyl sulfide, methylethyl sulfide, dimethylethylene amine, tri-n-propyl amine, tri-n-butyl amine, trimethyl amine, triethyl amine, N,N-dimethylaniline, pyridine, quinoline, N-ethylpiperylene, N-methyl-N-ethylaniline, N-methylmorpholine, and the like. It is also to be understood that mixtures of these polar compounds can be employed in the practice of the invention.

The presence of the polar compound in the solvent mixture results in the formation of a random copolymer. If the polar compound is not employed, e.g. in the polymerization of butadiene and styrene, a block copolymer is formed. In general, the amount of polar compound employed in the solvent mixture is that which is necessary to cause the desired copolymerization of the monomeric materials. The amount generally falls in the range of 0.005 to 50 weight percent of the total solvent mixture. In the case of dialkyl ethers, it is preferred that the solvent mixture contain at least 1 percent by weight, more desirably at least 3 percent by weight, of these polar compounds. With certain of the more active polar compounds, lesser amounts can be utilized. For example, heterocyclic ethers, such as tetrahydrofuran, can be employed in amounts ranging from 0.1 to 50 weight percent while diethers, such as 1,2-dimethoxethene, can be used in amounts ranging from 0.005 to 50 weight percent of the total solvent. The remainder of the solvent mixture is an aromatic, paraffinic or cycloparaffinic hydrocarbon as heretofore noted.

The organolithium compound used as a catalyst in the polymerization process corresponds to the general formula $R(li)_x$, wherein R is a hydrocarbon radical selected from the group consisting of aliphatic, cycloaliphatic and aromatic radicals and $x$ is an integer of from 1 to 4, inclusive. The R group has a valence equal to the integer $x$ and preferably contains from 1 to 20, inclusive, carbon atoms, although higher molecular weight compounds can be employed. Examples of suitable organolithium compounds which can be employed in the polymerization process include:

methyllithium,
isopropyllithium,
n-butyllithium,
tert-octyllithium,
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithiobutene-2,
1,8-dilithio-3-decene,
1,4-dilithiobenzene,
1,5-dilithionaphthalene,
1,2-dilithio-1,2-diphenylethane,
1,5-dilithioanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,4,6-tetralithiocyclohexane,
1,2,3,5-tetralithio-4-hexoanthracene, and the like.

Referring to the drawings, a monomer and catalyst feed, selected solvent and polar compound is passed via conduit means 11 to reaction zone 10. The polymerization process can be carried out at any temperature within the range of about −80 to 150° C., but is is preferred to operate in the range of −20 to 80° C. The polymerization reaction can be carried out under autogeneous pressures. It is usually desirable to operate at pressures sufficient to maintain the monomeric materials substantially in the liquid phase. The pressure will thus depend upon the particular materials being polymerized, the solvent mixture being employed, and the temperature at which the polymerization is carried out. However, higher pressures can be employed, if desired, these pressures being obtained by some such suitable method as the pressurization of the reaction zone with a gas which is inert with respect to the polymerization reaction.

The amount of the organolithium compound employed in the polymerization process can vary over a rather wide range. In general, the amount should be at least 0.02 part by weight per 100 parts by weight of the monomers to be polymerized. The upper limits for the amount of the organolithium compound to be used depends largely upon the desired inherent viscosity of the copolymer obtained in the polymerization process. The inherent viscosity of the polymer product decreases with increasing amounts of the organolithium catalyst. A desirable catalyst level is from 0.1 to 2.0 parts by weight of organolithium per 100 parts by weight of the total monomers charged to the reaction zone 10.

Polymerization reaction zone effluent comprising rubbery polymer, unreacted monomer, a $C_4$ reject fraction, solvent, polar compound, and catalyst residues is withdrawn from reaction zone 10 via conduit means 12, contacted with a catalyst-inactivating agent passed to conduit 12 via conduit 15, and passed to a flash zone 13. At the completion of the polymerization reaction the total reaction mixture is treated to inactivate the catalyst. While it is to be understood that any treating method can be employed, one method for accomplishing the desired treatment comprises adding to the reaction mixture a catalyst-inactivating material such as water, an alcohol, e.g. ethyl alcohol or isopropyl alcohol, an organic or inorganic acid or the like. It is generally preferred to add only an amount of the catalyst-inactivating material which is sufficient to inactivate the catalyst. It has also been found advantageous to add an antioxidant, such as phenyl-beta-naphthyl amine, to the polymer solution prior to precipitation of the polymer.

Within flash zone 13, the polymerization zone effluent is reduced in pressure, flash vaporizing a portion of the solvent and concentrating the rubber polymer withdrawn from reaction zone 10. For example, the pressure of the reaction zone effluent can be reduced from about 60 pounds per square inch absolute to about 16 pounds per square inch absolute. A vapor stream comprising unreacted monomer, solvent, polar compound and a $C_4$ reject fraction comprising butylenes is withdrawn from flash zone 13 via conduit means 16. A liquid stream comprising rubber polymer, catalyst residues, catalyst-inactivating agents, solvent and polar compound is withdrawn from flash zone 13 via conduit means 14 and passed to stripping zone 22.

The vapor stream withdrawn from flash zone 13 is condensed via heat exchange means 17 and passed via conduit means 18 to a fractionation zone 19. Fractionation zone 19 is operated so as to separate a $C_4$ reject fraction comprising butylenes from the feedstream, said $C_4$ reject fraction withdrawn from fractionation zone 19 via conduit means 20. A liquid fraction comprising monomer, solvent and polar compound is withdrawn from fractionation zone 19 via conduit means 21 and recycled to reaction zone 10.

Water is passed to stripping zone 22 via conduit means 40. Steam and solvent vapors, from a source hereinafter described, are transmitted via conduit means 41 to stripping zone 22. The temperature and pressure of stripping zone 22 can be maintained in the range of about 150-225° F. and in the range of about 5-25 p.s.i.a., respectively, with the specific temperature and pressure employed dependent upon the specific diluent and the rubbery polymer present in the feedstream.

An overhead vaporous stream comprising solvent, polar compound and steam is withdrawn from the upper region of stripping zone 22 via conduit means 26. A slurry comprising water, catalyst residues and solid rubber is withdrawn from the lower region of stripping zone 22 via conduit means 23 and passed to a second stripping zone 24.

Within stripping zone 24, the slurry is contacted with steam passed to stripping zone 24 via conduit means 42. A vaporous overhead stream comprising solvent and steam is withdrawn from the upper region of stripping zone 24 and passed via conduit means 41, as heretofore described, to stripping zone 22. Rubber crumb slurried in water is withdrawn from stripping zone 24 via conduit means 43 and passed to further processing steps not herein illustrated. Stripping zone 24 can be operated at a temperature in the range of 214 to 245° F. and at a pressure of 1.5 to 5 p.s.i. higher than the pressure within stripping zone 22.

The vaporous fraction withdrawn from stripping zone 22 is condensed via heat exchange means 27 and passed via conduit means 28 to a liquid phase separator 29. Within liquid phase separator 29, the feed is permitted to separate into a hydrocarbon phase and a water phase. The water phase is withdrawn from phase separator 29 via conduit means 30 and recycled via conduit means 40 to stripping zone 22. The hydrocarbon phase is withdrawn from phase separator 29 via conduit means 31 and passed to a solvent drying column 32.

The temperatures and pressures maintained within drying column 32 will be dependent upon the particular solvent employed. A vapor stream comprising solvent and water is condensed in heat exchange means 36 and passed through conduit means 37 to accumulator 38. Within accumulator 38, the feed is separated into a water phase and a liquid hydrocarbon phase. The liquid hydrocarbon phase is withdrawn from accumulator 38 via conduit means 39 and recycled to drying column 32. The water phase is withdrawn from the water leg of accumulator 38 and passed through conduit means 40 to stripping zone 22. Additional water as required is passed to conduit means 40 via conduit means 35.

Liquid solvent containing the polar compound is withdrawn from drying column 32 via conduit means 33 and recycled via conduit means 11 to reaction zone 10. Additional solvent as required is passed to conduit means 33 via conduit means 44.

Assume, for example, that tetrahydrofuran is employed as the polar compound and that hexane is the solvent material employed. Tetrahydrofuran will be steam stripped within stripping zone 22 and will be withdrawn from stripping zone 22 with the hexane via conduit means 26. The tetrahydrofuran will be condensed by heat exchange means 27 being miscible with both water and hydrocarbons and will be distributed between the water and hexane phases within separator 29. As the water phase is recycled from separator 29 via conduit means 30 and 40 to stripping zone 22, the tetrahydrofuran will build up within stripping zone 22 until the quantity of tetrahydrofuran leaving stripping zone 22 will equal the quantity of tetrahydrofuran leaving separator 29 via conduit means 31 in the hexane solvent phase.

The tetrahydrofuran in the feed to drying column 32 will continue to bulid up until the tetrahydrofuran is forced from the bottom of drying column 32 via conduit means 33 and is recycled to the reaction zone via conduit means 33 and 11. Tetrahydrofuran passing overhead from drying column 32 is recycled back to drying column 32 via conduit means 39, or is passed with the water phase from accumulator 38 to stripping zone 22 via conduit means 40.

Although the invention is particularly applicable to the recovery of organic polar compounds miscible with water and the solvents, it is also applicable to the recovery of organic polar compounds miscible with the hydrocarbon only. With a polar compound miscible only with the solvent material, the polar compound will be withdrawn from drying column 32 with the solvent and recycled via conduit means 33 and 11 to reaction zone 10.

Various modifications of this invention can be made, or followed, in view of the foregoing disclosure without departing from the spirit or scope thereof.

I claim:

1. An organic polar compound recovery process which comprises passing a polymerization zone effluent mixture comprising polymer, a solvent immiscible in water and organic polar compound soluble in both water and aforementioned solvent to a first stripping zone, passing water to said first stripping zone, withdrawing a mixture from the lower region of said first stripping zone and passing said mixture to a second stripping zone, passing steam to said second stripping zone, passing a vaporous stream from said second stripping zone to the lower region of said first stripping zone, withdrawing a mixture comprising water and solid polymer from the lower region of said second stripping zone, withdrawing a vaporous mixture comprising water, solvent and organic polar compound from the upper region of said first stripping zone, condensing said vaporous mixture withdrawn from said first stripping zone, passing said condensed mixture to a liquid phase separation zone, recycling a water phase from said liquid phase separation zone to said first stripping zone, passing a liquid solvent phase from said liquid phase separation zone to a drying zone, withdrawing a solvent containing said organic polar compound from said drying zone, passing said solvent containing an organic polar compound to a polymerization reaction zone, withdrawing a vapor from the upper region of said drying zone, condensing said vapor withdrawn from the upper region of said drying zone and passing said condensed vapor to a storage zone, recycling a liquid from said storage zone to the upper region of said drying zone, and recycling water from said storage zone to said stripping zone.

2. The process of claim 1 wherein said solvent is hexane and said organic polar compound is tetrahydrofuran.

3. An organic polar compound recovery process which comprises passing a polymerization zone effluent mixture comprising polymer, a solvent immiscible with water, and an organic polar compound selected from ethers, thioethers (sulfides) and tertiary amines soluble in both water and aforementioned solvent to a stripping zone, passing steam to said stripping zone, passing water to stripping zone, withdrawing a mixture comprising water and solid polymer from said stripping zone, withdrawing a vaporous mixture comprising water, solvent, and organic polar compound from said stripping zone, condensing said vaporous mixture and passing said condensed mixture to a liquid phase separation zone, recycling a water phase from said liquid phase separation zone to said stripping zone, passing a liquid solvent phase from said liquid phase separation zone to a drying zone, withdrawing a liquid solvent containing said organic polar compound from said drying zone, passing said liquid solvent containing organic polar compound to a polymerization reaction zone, maintaining temperature and pressure conditions in said drying zone to withdraw a vaporous stream of water and said organic polar compound from said drying zone, condensing said vaporous stream withdrawn from said drying zone to form a liquid containing said organic polar compound and passing said condensed vaporous stream to a storage zone, recycling a liquid from said storage zone to the upper region of said drying zone, and recycling a water stream containing said organic polar compound from said storage zone to said stripping zone.

4. The process of claim 3 wherein said solid polymer comprises a rubber crumb.

References Cited

UNITED STATES PATENTS

| | | | |
|---|---|---|---|
| 2,414,646 | 1/1947 | Hepp | 203—97 X |
| 2,437,649 | 3/1948 | Milner | 203—96 X |
| 2,912,416 | 11/1959 | Newey | 260—86.7 X |
| 2,964,512 | 12/1960 | Goins | 260—96 X |
| 3,004,958 | 10/1961 | Berens | 260—86.7 |
| 3,040,015 | 6/1962 | Cheney | 260—94.9 X |
| 3,085,998 | 4/1963 | Ross | 260—94.9 X |
| 3,151,046 | 9/1964 | Larson | 203—96 X |

NORMAN YUDKOFF, *Primary Examiner.*